(12) United States Patent
Huang (10) Patent No.: US 11,582,400 B2
(45) Date of Patent: Feb. 14, 2023

(54) METHOD OF IMAGE PROCESSING BASED ON PLURALITY OF FRAMES OF IMAGES, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventor: Jiewen Huang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 271 days.

(21) Appl. No.: 16/839,582

(22) Filed: Apr. 3, 2020

(65) Prior Publication Data

US 2020/0329187 A1    Oct. 15, 2020

(30) Foreign Application Priority Data

Apr. 9, 2019  (CN) .......................... 201910279856.X (51) Int. Cl.
*H04N 5/235* (2006.01)
*G06T 5/00* (2006.01)

(52) U.S. Cl.
CPC ........... *H04N 5/2355* (2013.01); *G06T 5/002* (2013.01); *G06T 5/009* (2013.01); *H04N 5/2353* (2013.01); *G06T 2207/20208* (2013.01)

(58) Field of Classification Search
CPC .... H04N 5/2355; H04N 5/2353; H04N 5/217; H04N 5/23232; H04N 5/265; H04N 5/23264; H04N 5/23267; G06T 5/002; G06T 5/009; G06T 5/007; G06T 5/50; G06T 2207/20208; G06T 2207/20012; G06T 2207/20221

See application file for complete search history.

(56) References Cited

U.S. PATENT DOCUMENTS

2013/0335596 A1  12/2013  Demandolx et al.
2014/0270487 A1*  9/2014  Park ..................... H04N 5/2355
                                                              382/155
2018/0293711 A1  10/2018  Vogels et al.
(Continued)

FOREIGN PATENT DOCUMENTS

CN  103312942 A  9/2013
CN  105959559 A  9/2016
(Continued)

OTHER PUBLICATIONS

International search report for PCT/CN2020/083562; dated Jul. 8, 2020; (10 pages).
(Continued)

*Primary Examiner* — Kelly L Jerabek
(74) *Attorney, Agent, or Firm* — Young Basile Hanlon & MacFarlane, P.C.

(57) ABSTRACT

A method of image processing based on a plurality of frames of images, an electronic device, and a storage medium are provided. The method includes: capturing a plurality of frames of original images; obtaining a high dynamic range (HDR) image by performing image synthesis on the plurality of frames of original images; performing artificial intelligent-based denoising on the HDR image to obtain a target denoised image.

19 Claims, 4 Drawing Sheets

(56) References Cited

U.S. PATENT DOCUMENTS

| | | | | |
|---|---|---|---|---|
| 2019/0199948 A1* | 6/2019 | Kim | ............ | H04N 5/3597 |
| 2019/0356891 A1* | 11/2019 | Zhang | ............ | G09G 5/10 |
| 2020/0186697 A1* | 6/2020 | Lee | ............ | H04N 9/04557 |
| 2020/0265567 A1* | 8/2020 | Hu | ............ | G06N 3/0454 |
| 2021/0287341 A1* | 9/2021 | Birkbeck | ............ | G06T 5/002 |

FOREIGN PATENT DOCUMENTS

| | | |
|---|---|---|
| CN | 106127698 A | 11/2016 |
| CN | 106679676 A | 5/2017 |
| CN | 107220956 A | 9/2017 |
| CN | 107809593 A | 3/2018 |
| CN | 107948520 A | 4/2018 |
| CN | 108122206 A | 6/2018 |
| CN | 108280811 A | 7/2018 |
| CN | 108322646 A | 7/2018 |
| CN | 108492262 A | 9/2018 |
| CN | 108924420 A | 11/2018 |
| CN | 108989700 A | 12/2018 |
| CN | 109040609 A | 12/2018 |
| CN | 109089046 A | 12/2018 |
| CN | 109218628 A | 1/2019 |
| CN | 110072051 A | 7/2019 |
| WO | 2017215767 A1 | 12/2017 |

OTHER PUBLICATIONS

English Translation of First Office Action from China patent office in a counterpart Chinese patent Application 201910279856.X; dated Jun. 12, 2020; (26 pages).

European search report; EP20168340; dated Aug. 24, 2020; (6 pages).

Second Office Action with English Translation from China patent office in a counterpart Chinese patent Application 201910279856.X, dated Jan. 8, 2021 (23 pages).

Chinese Third Office Action with English Translation for CN Application 201910279856.X dated Apr. 9, 2021. (14 pages).

Indian Examination Report for IN Application 202014015464 dated Sep. 10, 2021. (7 pages).

Chinese Office Action with English Translation for CN Application 201910279856.X dated Aug. 11, 2021. (6 pages).

\* cited by examiner

METHOD OF IMAGE PROCESSING BASED ON PLURALITY OF FRAMES OF IMAGES, ELECTRONIC DEVICE, AND STORAGE MEDIUM

CROSS-REFERENCE TO RELATED APPLICATION(S)

The present application claims priority to Chinese Patent Application No. 201910279856.X, filed on Apr. 9, 2019, the disclosure of which is herein incorporated by reference in its entirety.

TECHNICAL FIELD

The present disclosure relates to the field of imaging, and in particular to a method of image processing based on a plurality of frames of images, an electronic device, and a computer-readable non-transitory storage medium.

BACKGROUND

As technologies of intelligent terminals develop, usage of a mobile terminal (such as a smart phone, a tablet computer, and the like) is becoming more and more popular. Majority of mobile terminals may be incorporated with cameras. As processing capability of the mobile terminal is increased, and technologies of the camera develop, performance of an incorporated camera may be improved dramatically, and quality of a captured image may be improved. For now, the mobile terminal may be portable and easily operated, and an increased number of users are using smart phones, tablet computers, and other mobile terminals to photograph.

Besides the mobile terminal brings convenient for people's daily lives, people desire higher quality for captured images, especially when photographing at a night scene, the quality of the image captured at the night scene may be relatively poor.

Currently in the art, a plurality of frames of original images may be captured, and high dynamic image synthesis may be performed. However, during capturing the plurality of frames of original images, noise may be introduced resulting in a synthesized image having poor definition. Therefore, how to perform denoising on an image and maintain details of the original images as much as possible may be a technical problem to be solved.

SUMMARY

According to a first aspect of the present disclosure, a method of image processing based on a plurality of frames of images is provided and includes: capturing a plurality of frames of original image; obtaining a high dynamic range (HDR) image by performing image synthesis on the plurality of frames of original images; and performing artificial intelligent (AI)-based denoising on the HDR image to obtain a target denoised image.

According to a second aspect of the present disclosure, an electronic device is provided and includes image sensor, a non-transitory memory, a processor, and a computer program stored in the non-transitory memory and run by the processor. The processor comprises an image signal processing (ISP) pipeline and a graphics processing unit (GPU) connected to the ISP pipeline. The ISP pipeline is arranged to control the image sensor to capture a plurality of original images and perform high dynamic synthesis on the plurality of original images to obtain a HDR image. The GPU is arranged to perform AI-based denoising on the HDR image to obtain a target denoised image.

According to a third aspect of the present disclosure, a computer-readable non-transitory storage medium, comprising a computer program stored in, wherein the computer program is capable of being executed by a processor to perform operations of: capturing a plurality of frames of original images; obtaining a high dynamic range (HDR) image by performing image synthesis on the plurality of frames of original images; and performing artificial intelligent (AI)-based denoising on the HDR image to obtain a target denoised image.

BRIEF DESCRIPTION OF DRAWINGS

Aspects and advantages of the above-mentioned description and/or any addition aspects and advantages of the present disclosure may be clarified and may be easily understood by referring to the drawings.

DETAILED DESCRIPTION

Embodiments of the present disclosure may be illustrated in detail hereinafter, and examples of the embodiments may be shown in the drawings. A same or similar reference number may indicate a same or similar element or elements having a same or similar function. The embodiments described by referring to the drawings are illustrative for explaining the present disclosure, but not to limit the present disclosure.

In the related art, during performing high dynamic range image synthesis, a large number of frames may be captured, time consumed for capturing the large number of frames may be long, and therefore, a user's hand may shake resulting in captured images being smeared, or noise may be introduced during capturing, such that the captured image may be blurry. The present disclosure may provide a method of image processing based on a plurality of frames of images. A plurality of frames of original images may be captured, and a high dynamic range image may be synthesized based on the plurality of frames of original images. An artificial intelligence (AI)-based denoising may be performed on the high dynamic range image to obtain a target denoised image.

According to a first aspect of the present disclosure, a method of image processing based on a plurality of frames of images is provided and includes: capturing a plurality of frames of original image; obtaining a high dynamic range (HDR) image by performing image synthesis on the plurality of frames of original images; and performing artificial intelligent (AI)-based denoising on the HDR image to obtain a target denoised image.

In some embodiments, the performing AI-based denoising on the HDR image to obtain a target denoised image includes: performing, by a neural network model, noise characteristics identification on the HDR image, wherein the neural network model learns and obtains a mapping relation between a light sensitivity and the noise characteristics of the HDR image; and performing denoising on the HDR image based on the identified noise characteristics to obtain the target denoised image.

In some embodiments, the neural network model is trained by taking a plurality of sample images with a plurality of light sensitivities as samples, and the training of the neural network model is completed when the noise characteristics identified by the neural network model matches with the noise characteristics labeled in a corresponding sample image.

In some embodiments, the plurality of original images includes at least two frames of first images having a same exposure amount and at least one frame of a second image having an exposure amount lower than the exposure amount of the first images. The obtaining a high dynamic range (HDR) image by performing image synthesis on the plurality of frames of images includes: performing multi-frame denoising on the at least two frames first images to obtain a synthesized denoised image; and performing high dynamic synthesis on the synthesized denoised image and the at least one frame of the second image to obtain the HDR image.

In some embodiments, the obtaining a HDR image by performing image synthesis on the plurality of frames of original images includes: inputting the plurality of original images into a high dynamic synthesis model to obtain a synthesis weight of each area of a corresponding original image; and performing image synthesis to each area of the plurality of original images based on the synthesis weight of each area to obtain the HDR image.

In some embodiments, the high dynamic synthesis model learns and obtains a mapping relation between characteristics of each area of the plurality of original images and the synthesis weight; and the characteristics of each area is arranged to indicate an exposure amount of each area and a luminance level of a corresponding area.

In some embodiments, before the capturing a plurality of frames of original images, the method further includes: capturing a preview image. The capturing a plurality of frames of original images includes: determining the number n of frames of original images having a reference exposure amount to be captured based on quality of the preview image; capturing n frames of original images meeting the reference exposure amount; and capturing at least one frame of an original image having an exposure amount lower than the reference exposure amount. The n is a natural number greater than or equal to 2.

In some embodiments, the capturing n frames of original images meeting the reference exposure amount includes: determining the reference exposure amount based on a luminance level of a scene of image capturing; determining reference exposure duration based on the reference exposure amount and a preset reference light sensitivity; and capturing n frames of original images based on the reference exposure duration and the reference light sensitivity.

In some embodiments, the capturing at least one frame of original image having an exposure amount lower than the reference exposure amount includes: performing compensation on the reference exposure duration based on a preset exposure compensation level to obtain compensated exposure duration shorter than the reference exposure duration; and capturing the at least one frame of the original image based on the compensated exposure duration and the reference light sensitivity.

In some embodiments, the at least one frame of original image is two frames of original images; and the two frames of original images correspond to different exposure compensation levels, and the exposure compensation levels corresponding to the two frames of original images are less than EV0.

In some embodiments, before the determining reference exposure duration based on the reference exposure amount and a set reference light sensitivity, the method further includes: setting the reference light sensitivity based on a degree of smear of the preview image or based on a degree of shaking of an image sensor capturing the preview image.

In some embodiments, a value of the reference light sensitivity is within a range of 100 ISO to 200 ISO.

In some embodiments, an exposure compensation level corresponding to the at least one frame of original image is within a range of EV-5 to EV-1.

In some embodiments, the number n of frames is equal to 3 or 4.

In some embodiments, after the performing AI-based denoising on the HDR image to obtain a target denoised image, the method further includes: converting a format of the target denoised image into a YUV format.

According to a second aspect of the present disclosure, an electronic device is provided and includes image sensor, a non-transitory memory, a processor, and a computer program stored in the non-transitory memory and run by the processor. The processor comprises an image signal processing (ISP) pipeline and a graphics processing unit (GPU) connected to the ISP pipeline. The ISP pipeline is arranged to control the image sensor to capture a plurality of original images and perform high dynamic synthesis on the plurality of original images to obtain a HDR image. The GPU is arranged to perform AI-based denoising on the HDR image to obtain a target denoised image.

In some embodiments, the GPU is further arranged to perform noise characteristics identification on the HDR image and perform denoising on the HDR image based on the identified noise characteristics to obtain the target denoised image.

In some embodiments, the plurality of original images includes at least two frames of first images having a same exposure amount and at least one frame of a second image having an exposure amount lower than the exposure amount of the first images. The ISP pipeline is further arranged to perform multi-frame denoising on the at least two frames first images to obtain a synthesized denoised image and perform high dynamic synthesis on the synthesized denoised image and the at least one frame of the second image to obtain the HDR image.

In some embodiments, the ISP pipeline is further arranged to the plurality of original images into a high dynamic synthesis model to obtain a synthesis weight of each area of a corresponding original image and perform image synthesis on each area of the plurality of original images based on the synthesis weight of each area to obtain the HDR image.

According to a third aspect of the present disclosure, a computer-readable non-transitory storage medium, comprising a computer program stored in, wherein the computer program is capable of being executed by a processor to perform operations of: capturing a plurality of frames of original images; obtaining a high dynamic range (HDR) image by performing image synthesis on the plurality of frames of original images; and performing artificial intelligent (AI)-based denoising on the HDR image to obtain a target denoised image.

The method of image processing based on a plurality of frames of images and the apparatus of embodiments of the present disclosure may be illustrated hereinafter by referring to the drawings.

Figure 1:
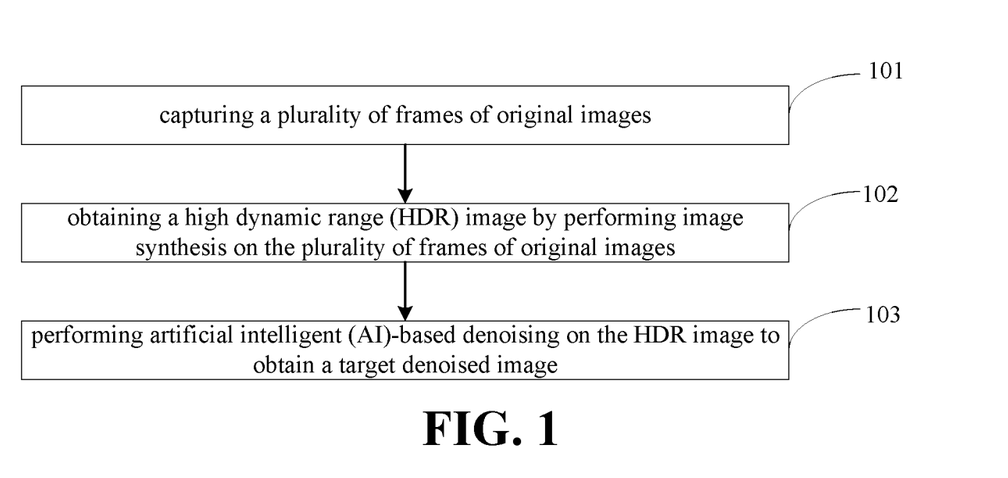
FIG. 1 is a flow chart of a first method of image processing based on a plurality of frames of images according to an embodiment of the present disclosure.

FIG. 1 provides a flow chart of a first method of image processing based on a plurality of frames of images according to an embodiment of the present disclosure.

The method image processing based on a plurality of frames of images may be performed by an electronic device. The electronic device may be a hardware device having an operating system and an imaging component, such as a mobile phone, a tablet computer, a personal digital assistant, a wearable device, and the like.

As shown in FIG. 1, the method of image processing based on a plurality of frames of images may include following operations.

In an operation of 101, a plurality of frames of original images may be captured.

An original image may be a RAW image captured by an image sensor of the electronic device and without any process performed. The RAW image may be an original image of a digital signal transferred from a light source signal captured by the image sensor. The RAW image may record original information captured by a digital camera sensor and metadata generated during the camera capturing, such as a setting of a light sensitivity, a shutter speed, an aperture value, white balance, and the like.

A preview image of a present scene may be captured to determine whether the present scene is a night scene. As various scenes may have various ambient luminance values, various preview images of the various scenes may have various contents. The present scene may be determined to be the night scene based on the content of the preview image of the present scene and the ambient luminance values of various regions of the preview image, and a night scene capturing mode may be activated, and the plurality of frames of original images may be captured with various exposure parameter values.

For example, the present scene may be determined to be the night scene in response to the content of the preview image including a sky at night or a light source of a night scene, alternatively, in response to the ambient luminance values of various regions of the preview image meeting a feature of luminance distribution of an image of a night scene.

During capturing at a night scene, environmental factors, such as light intensity of the scene may impact the capturing process. When the electronic device is capturing an image, a single-frame image may not be able to take account of a high luminance area of the night scene (such as a lamp and the like) and a low luminance area of the night scene at the same time. Therefore, the electronic device may capture a plurality of frames of original images for image synthesis, and original images with high definition may be selected for the image synthesis. The image sensor of the electronic device may be required to be controlled to capture the plurality of frames of original images with various exposure amounts to take account of the high luminance area of the night scene (such as the lamp and the like) and the low luminance area of the night scene at the same time. For example, a low exposure amount may be applied to obtain a high definition image for the high luminance area, and a high exposure amount may be applied to obtain a high definition image for the low luminance area.

In an operation of 102, high dynamic synthesis may be performed on the plurality of frames of original images to obtain a high dynamic range image.

The high dynamic synthesis may be performed on a plurality of images of a same scene with various exposure parameter values to obtain the high dynamic range image (HDR image). To be noted that, compared to an ordinary image, the HDR image may provide a larger dynamic range and more image details. A plurality of low-dynamic range (LDR) images with various exposure duration may be captured, and the HDR image may be obtained by performing image synthesis on LDR images having optimal details corresponding to each of the various exposure duration, such that a visual effect of a real scene may be shown optimally.

Specifically, the HDR image may be obtained by taking image information from the plurality of frames of original images and superimposing the image information correspondingly.

To be noted that, as the plurality of frames of original images may be captured at various exposure conditions, the plurality of frames of original images may include image information with various luminance levels. A same object may be over-exposed in some original images, under exposed in some other images, and properly exposed in still other original images. After performing high dynamic synthesis on the plurality of frames of original images, each component of the object in the HDR image may be processed to be properly exposed as much as possible, and that is, more close to a real object in the real scene.

In an operation of 103, a target denoised image may be obtained by performing artificial intelligence (AI)-based denoising on the HDR image.

During capturing, to varying degrees, the image sensor of the electronic device may receive electromagnetic interference from a surrounding circuit and electromagnetic interference from pixels of the electronic device, and therefore, the captured original images have noise inevitably, and definition of various original images may be various due to various interference degrees. Therefore, the HDR image includes noise as well, and denoising may further be performed on the HDR image. For example, during capturing at the night scene, a relatively large aperture and a relatively long exposure duration may be applied for capturing the image. Under such a situation, in response to improving a light sensitivity to reduce the exposure duration, the captured image has the noise inevitably.

According to the present embodiment, the AI-based denoising may be performed on the synthesized HDR image. The high luminance area and the low luminance area of the HDR image may be denoised at the same time, such that the target denoised image having a preferred denoise effect may be obtained.

As a potential implementation, a plurality of sample images of various light sensitivities captured at various ambient luminance levels may be obtained, and the plurality of sample images may be taken as samples to train a neural network model. Statistical characteristics labeled in the plurality of sample images may be taken as characteristics for training the model. The plurality of sample images with the statistical characteristics labeled may be inputted into the neural network model for training, such that statistical characteristics of the HDR image may be identified. The neural network model may be only one of a plurality of potential implementations to achieve the AI-based denoising. During an actual performance, the AI-based denoising may be achieved by any other means, such as by conventional programming (such as simulation and an engineering method) or a genetic algorithm.

The neural network model may learn and obtain a mapping relation between the light sensitivity of the HDR image and the noise of the HDR image. Therefore, the HDR image obtained by high dynamic synthesis may be inputted into the neural network model, and the neural network model may perform noise characteristics identification on the HDR image, such that noise characteristics of the HDR image may be identified. The HDR image may be denoised based on the identified noise characteristics to obtain the target denoised image, such that denoising may be achieved, and a signal noise ratio (SNR) of the HDR image may be improved.

The light sensitivity, represented by means of an international organization for standardization (ISO) value, is an index to evaluate a sensitivity of a negative film to the light. To achieve a same image, a negative film having a relatively low light sensitivity may be exposed for a longer period of time than a negative film having a relatively high light sensitivity. The light sensitivity of a digital camera may be an index similar to the light sensitivity of the film. The ISO value of the digital camera may be adjusted by adjusting a sensitivity of a photosensitive element of the digital camera or by combining photosensitive sites of the digital camera. In other words, the ISO value may be improved by improving the light sensitivity of the photosensitive element or by combining a plurality of adjacent photosensitive sites.

To be noted that, for the digital camera and a camera of filming, the lower the ISO value, the higher the quality of the captured image, and the finer the details of the image. The higher the ISO value, the higher the light sensitivity, and that is, more light may be received by the camera, such that more heat may be generated. Therefore, applying a relatively higher light sensitivity may introduce more noise, such that the quality of the captured image may be reduced. In the present embodiment, the noise characteristics may be statistical characteristics of a random noise caused by the image sensor. The noise mentioned herein may substantially include heat noise and shot noise. The heat noise may conform to a Gaussian distribution, and the shot noise may conform to a Poisson distribution. The statistical characteristics of the present embodiment may refer to a variance value of the noise, or may be a value of another situation, which will not be limited by the present disclosure.

Alternatively, a display of the electronic device may process an image in a YUV format. A luminance signal of an image may be referred as Y, and a chrominance signal of the image may include two independent signals, and the two independent signals may be referred as U and V according to a color system and a format. Under such a situation, after the target denoised image in a RAW format is obtained, format conversion may be performed on the target denoised image by an image signal processing (ISP), such that the target denoised image in the RAW format may be converted in to an image in the YUV format. As a size of an interface of the display is limited, the converted image in the YUV format may be compressed into a size able to be displayed for preview, achieving a preferred preview effect.

To be noted that, a method of converting the target denoised image from the RAW format to the YUV format may be available in the art, and will be not be illustrated hereinafter.

According to the present embodiment, the method of image processing based on a plurality of frames of images is provided. A plurality of frames of original images may be captured, and high dynamic synthesis may be performed on the plurality of frames of original images to obtain the HDR image. AI-based denoising may be performed on the HDR image to obtain the target denoised image. According to such a method, image noise and effective details of the HDR image may be distinguished more accurately according to the denoising process, the number of frames of original images to be captured may be reduced compared to a method without the denoising process, and the light sensitivity for capturing each frame of an original image may be increased to reduce capturing duration, such that total duration of image capturing may be reduced, a possibility of a blurry image caused by prolonged duration of image capturing may be reduced, enabling to capture images of a dynamic night scene with high definition. In addition, according to the present embodiment, after performing high dynamic synthesis on the plurality of frames of original images, denoising may be performed, such that the high luminance area and the low luminance area of the HDR image obtained by high dynamic synthesis may both be denoised, improving effectivity of denoising, and the target denoised image may have a lower noise and maintain details of the image at the same time, achieving an image with higher definition.

To achieve a preferred AI-based denoising effect, the neural network model may be applied for denoising and may be trained by taking a plurality of sample images having various light sensitivities as samples, such that a capability of the neural network model to identify noise characteristics may be improved. A training process may be shown in FIG. 2 and include following operations.

Figure 2:
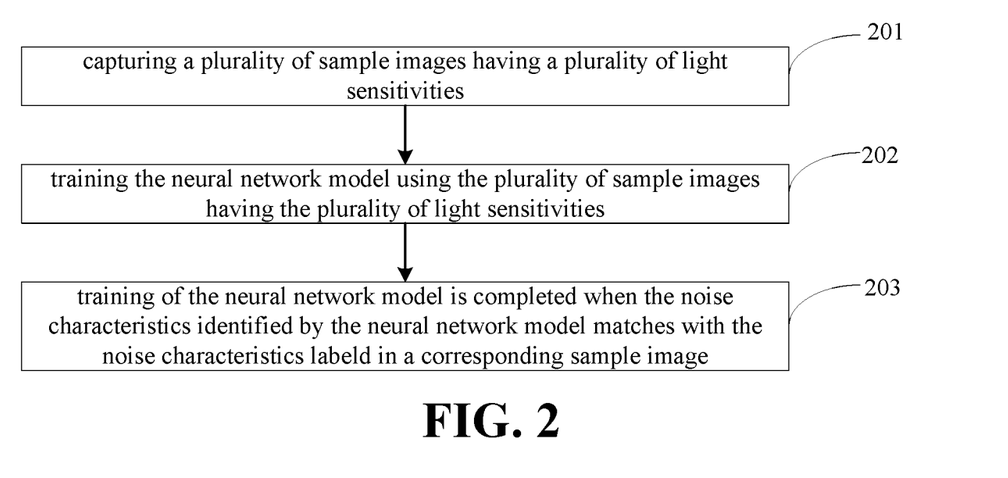
FIG. 2 is a flow chart of a second method of image processing based on a plurality of frames of images according to an embodiment of the present disclosure.

In an operation of 201, a plurality of sample images having various light sensitivities may be obtained.

The noise characteristics of each of the plurality of sample images may be labeled.

In the present embodiment, the plurality of sample images may be captured at various ambient luminance levels and by setting various light sensitivities. In other words, a plurality of ambient luminance levels may be available, a plurality of frames of images may be captured with the various light sensitivities at each of the plurality of ambient luminance levels, and the plurality of frames of images may be taken as the plurality of sample images. To obtain a more accurate identification result of the noise characteristics, the ambient luminance level and the ISO value may further be subdivided, or the number of frames of the sample images may be increased, such that, after the HDR image obtained by high dynamic synthesis is inputted into the neural network model, the neural network model may identify the statistical characteristics of the HDR image.

In an operation of 202, the neural network model may be trained by taking the plurality of sample images as samples.

In the present embodiment, after the plurality of sample images captured with various light sensitivities at various ambient luminance levels are obtained, the plurality of sample images may be taken as samples for training the neural network model. The statistical characteristics labeled in the plurality of sample images may be taken as characteristics for training the model. The plurality of sample images with the statistical characteristics labeled may be inputted into the neural network model to train the neural network model, such that the neural network model may identify the statistical characteristics of an image to be processed. The neural network model may be only one of a plurality of potential implementations to achieve the AI-based denoising. During an actual performance, the AI-based denoising may be achieved by any other means, such as by conventional programming (such as simulation and an engineering method) or a genetic algorithm, which will not be limited by the present disclosure.

To be noted that, the statistical characteristics may be labeled in the plurality of sample images to train the neural network model, and this is because the labeled sample images may clearly exhibit a position of the noise and a type of the noise, such that the labeled statistical characteristics may be taken as the characteristics for training the model. After the HDR image is inputted into the neural network model, the statistical characteristics of the image to be processed (i.e., the HDR image in the present embodiment) may be identified.

In an operation of 203, training of the neural network model may be completed when the noise characteristics identified by the neural network model matches with the noise characteristics labeled in a corresponding sample image.

In the present embodiment, the neural network model may be trained by taking the plurality of sample images with various light sensitivities as samples, and the training is completed when the noise characteristics identified by the neural network model matches with the noise characteristics labeled in a corresponding sample image.

According to the present embodiment, the plurality of sample images with various light sensitivities may be captured, and the neural network model may be trained by taking the plurality of sample images with various light sensitivities as samples, and the training is completed when the noise characteristics identified by the neural network model matches with the noise characteristics labeled in a corresponding sample image. As the neural network model may be trained by taking the plurality of sample images captured with various light sensitivities and labeled with the statistical characteristics as samples, accurate identification of statistical characteristics of an image to be processed (i.e., the HDR image in the present embodiment) may be achieved after inputting the image into the neural network model, such that the image may be denoised, improving quality of the image.

Figure 3:
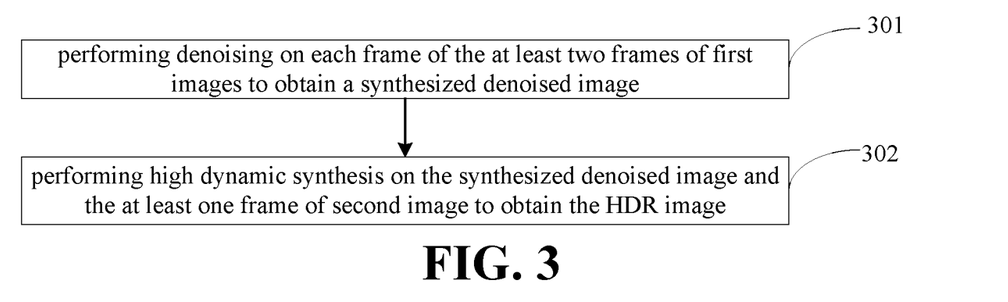
FIG. 3 is a flow chart of a third method of image processing based on a plurality of frames of images according to an embodiment of the present disclosure.

On the basis of the embodiment shown in FIG. 1, under a potential situation, the plurality of frames of original images captured in the operation of 101 may include at least two frames of first images having a same exposure amount, and the at least two frames of first images may be denoised in the operation of 102 to improve quality of imaging. The above-mentioned process may be illustrated in details by referring to FIG. 3. FIG. 3 is a flow chart of a third method of image denoising based on a plurality of frames of images according to the present embodiment of the present disclosure. As shown in FIG. 3, the operation of 102 may specifically include following operations.

In an operation of 301, multi-frame denoising may be performed on the at least two first images to obtain a synthesized denoised image.

The multi-frame denoising may refer to capturing a plurality of frames of images via an image sensor in a night scene or a scene of a low luminance level, finding various pixel points having noise characteristics from the plurality of frames, and obtaining a clear and fine image of the night scene or the scene of the low luminance level by performing weight-synthesis.

In the present embodiment, while the image sensor of the electronic device is capturing an image of a night scene or a scene of a low luminance level, at least two frames of first images may be captured. The number and positions of noise in a plurality of the at least two frames may be calculated and screened. A position of the noise in a frame may be replaced by a same position in another frame without noise. Weighing and replacing may be performed repeatedly to obtain a synthesized and fine denoised image. In such a way, by performing the multi-frame denoising, details in the low luminance area of the image may be processed smoothly, such that the image may be denoised and maintain more details at the same time.

In the present embodiment, definition of the at least two frames of first images may be determined based on a threshold definition, such that the at least two frames of first images may be screened, and a fine image may be retained for image synthesis. Specifically, when the definition of one of the at least two frames of first images is greater than or equal to the threshold definition, the first image may be determined to be the fine and may be retained. When the definition of one of the at least two frames of first images is less than the threshold definition, the first image may be determined to be blurry and may be screened out. Further, image synthesis may be performed on the retained fine first image to obtain the synthesized denoised image.

The threshold definition may be determined by manually assessing definition of a large amount of images. In response to the definition of an image being greater than or equal to the threshold definition, the image may be determined to be a fine image. In response to the definition of the image being less than the threshold definition, the image may be determined to be blurry.

As a potential implementation, the definition of each of the at least two frames of first images may be compared to the threshold definition, and the at least two frames of first images may be screened. In response to the number of first images screened out being not equal to zero, a degree of noise suppression may be increased on the basis of an initial degree of noise suppression, based on the number of first images being screened out.

It may be understood that, when a relatively large number of frames of first images are screened out, a large number of frames of first images captured by the electronic device may be blurry, the blurry first images may be discarded, and the number of first images required to be denoised may be reduced. On the basis of the initial degree of noise suppression, an increased degree of noise suppression may allow remaining first images to be effectively denoised. In such a way, the larger the number of frames of first images being screened out, the more the degree of noise suppression being increased from the basis of the initial degree of noise suppression. However, after performing filter-denoising on the first images by applying a relatively high degree of noise suppression, details remained in the image may be reduced.

As another potential implementation, the definition of the at least two frames of first images may be compared to the threshold definition, and the at least two frames of first images may be screened. In response to the number of first images screened out being equal to zero, the definition of each of the at least two frames of first images captured at present may be greater than the threshold definition.

According to the present embodiment, the degree of noise suppression may be increased or decreased based on the number of first images being screened out, the degree of noise suppression may be determined, such that weight-synthesizing and denoising may be performed on remaining first images to obtain the synthesized denoised image, such that noise of the synthesized image may be reduced effectively, and information of the synthesized image may be optimally maintained.

In an operation of 302, high dynamic synthesis may be performed on the synthesized denoised image and the at least one frame of a second image to obtain the HDR image.

In the present embodiment, each image content area of the synthesized denoised image and each image content area of the at least one frame of the second image may be superimposed to obtain the HDR image. For example, when the synthesized denoised image is obtained by performing multi-frame denoising on a plurality of frames of original images with EV0, a high luminance area of the HDR image may be over-exposed, and a medium luminance area and a low luminance area of the HDR image may be properly exposed. Typically, an EV value of the at least one frame of the second image may be negative. Therefore, a high luminance area of the second image may be properly exposed, and a medium luminance area and a low luminance area of the second image may be under-exposed. Weight-synthesizing may be performed on a same area corresponding to different images, such that each area of the image may be properly exposed, improving the quality of the image.

To be noted that, the noise of the synthesized denoised image may be effectively reduced, and image information may be maintained optimally. Therefore, after performing high dynamic synthesis on the at least one frame of the second image, the obtained HDR image may contain more image information, closer to the real scene.

According to the present embodiment, the multi-frame denoising may be performed on the at least two frames of first images to obtain the synthesized denoised image. High dynamic synthesis may be performed on the synthesized denoised image and the at least one frame of the second image to obtain the HDR image. In such a way, in the obtained HDR image, the noise may be effectively reduced, image information may be maintained as much as possible, and the quality of the image may be improved, providing better user experience.

Figure 4:
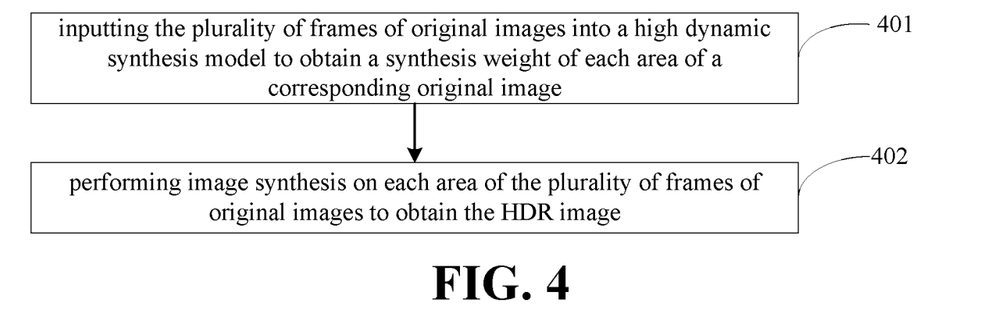
FIG. 4 is a flow chart of a fourth method of image processing based on a plurality of frames of images according to an embodiment of the present disclosure.

On the basis of the embodiment shown in FIG. 1, under another potential situation, the captured plurality of frames of original images may be inputted into a high dynamic synthesis model. Image synthesis may be performed on each area of the plurality of frames of original images based on a synthesis weight of each area to obtain the HDR image. The above-mentioned process may be illustrated in detail by referring to FIG. 4. FIG. 4 is a flow chart of a fourth method of image denoising based on a plurality of frames of images according to the present embodiment of the present disclosure. As shown in FIG. 4, the operation of 102 may specifically include following operations.

In an operation of 401, the plurality of frames of original images may be inputted in to the high dynamic synthesis model to obtain the synthesis weight of each area in a corresponding original image.

The high dynamic synthesis model may learn and obtain a mapping relation between characteristics of each area of the original image and the synthesis weight of each area. The characteristics of each area may represent the exposure amount and a luminance level of a corresponding area of the image.

In the present embodiment, the high dynamic synthesis model may learn and obtain the mapping relation between characteristics of each area of the original image and the synthesis weight. Therefore, after inputting the plurality of frames of original images into the high dynamic synthesis model, the synthesis weight of each area in each of the plurality of frames of original images may be determined by the high dynamic synthesis model based on the exposure amount of each of the plurality of frames of original images and the luminance level of each area in the corresponding image.

In an operation of 402, image synthesis may be performed on each area of the plurality of frames of original images based on the synthesis weight of each area to obtain the HDR image.

In the present embodiment, image synthesis may be performed on each area the plurality of frames of original images based on the determined synthesis weight of each area of the plurality of frames of original images to obtain the HDR image.

According to the present embodiment, the plurality of frames of original images may be inputted into the high dynamic synthesis model, and the synthesis weight of each area in the corresponding original image may be determined. Image synthesis may be performed on each area of the plurality of frames of original images based on the synthesis weight to obtain the HDR image. According to the present method, the synthesis weight of each area may be determined based on the characteristics of each area of the plurality of frames of original images, such that image synthesis may be performed on the plurality of frames of original images to obtain the HDR image. In the HDR image, the image information may be maintained as much as possible, improving the quality of the captured image and providing better user experience.

Figure 5:
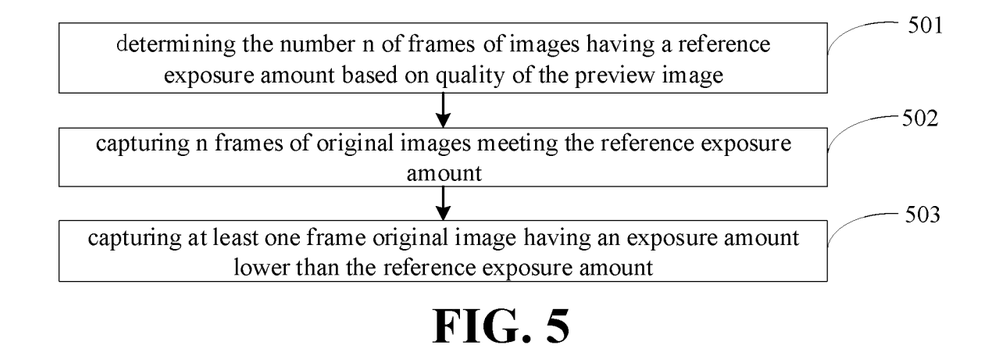
FIG. 5 is a flow chart of a fifth method of image processing based on a plurality of frames of images according to an embodiment of the present disclosure.

On the basis of the embodiment shown in FIG. 1, as another potential implementation, during capturing the plurality of frames of original images in the operation of 101, a preview image may be captured firstly. Specifically, the number n of frames of images with a reference exposure amount may be determined based on quality of the preview image, such that n frames of original images meeting the reference exposure amount may be captured, and at least one frame of an original image with an exposure amount less than the reference exposure amount may be captured. The above-mentioned process may be illustrated in details by referring to FIG. 5. As shown in FIG. 5, the operation of 101 may further include following operations.

In an operation of 501, the number n of frames of original images with the reference exposure amount may be determined based on the quality of the preview image.

The n may be a natural number equal to or greater than 2.

To be noted that, when a large number of frames of images are captured, time consumed for capturing may be too long, and the capturing process may be interfered by external factors more easily. Therefore, in the present embodiment, the number n of frames may be equal to 3 or 4 to reduce the time consumed for capturing, and an image with relatively high quality may be obtained.

Specifically, the quality of the preview image may be evaluated based on a degree of smear of the preview image or based on the SNR of the preview image, and the number n of frames of images with the reference exposure amount may be determined based on the quality of the preview image. A preview image with high quality may indicate that the capturing process may be interfered by the external factors at a relatively low degree, and the time consumed for capturing may be increased appropriately to capture more frames of original images. On the contrary, a preview image with low quality may indicate that the capturing process may be interfered by the external factors at a relatively high degree, and the time consumed for capturing may be reduced appropriately to capture fewer frames of original images.

For example, displacing information of the image sensor during the capturing process may be acquired by a displacement sensor arranged in the electronic device. A degree of shaking of the image sensor may be determined based on the acquired displacing information. Image quality may be evaluated based on the degree of shaking, such that a capturing scenario may be determined to be a tripod scenario with a relatively low degree of shaking or a hand-held scenario with a relatively high degree of shaking.

In a potential scenario, in response to determining a present capturing scenario being the tripod scenario based on the degree of shaking of the image sensor, a larger number of frames of original images may be captured, more of different image information may be included, and the HDR image obtained by performing high dynamic synthesis may include more image information, closer to the real scene. At the same time, as the image is steady, even if a plurality of frames of original images are used for image synthesis, the synthesized image may not be blurry. Therefore, in the tripod scenario, a larger number of frames of original images may be captured for performing image synthesis to obtain the HDR image to obtain high quality of imaging.

In another potential scenario, in response to determining a present capturing scenario being the hand-held scenario based on the degree of shaking of the image sensor, the preview image may exhibit a relatively high degree of smear. A smaller number of frames of original images may be captured for image synthesis to avoid the synthesized HDR image from being blurry.

In an operation of 502, n frames of original images meeting the reference exposure amount may be captured.

In the present embodiment, after determining the number n of frames of original images with the reference exposure amount based on the quality of the preview image, n frames of original images meeting the reference exposure amount may be captured.

Figure 6:
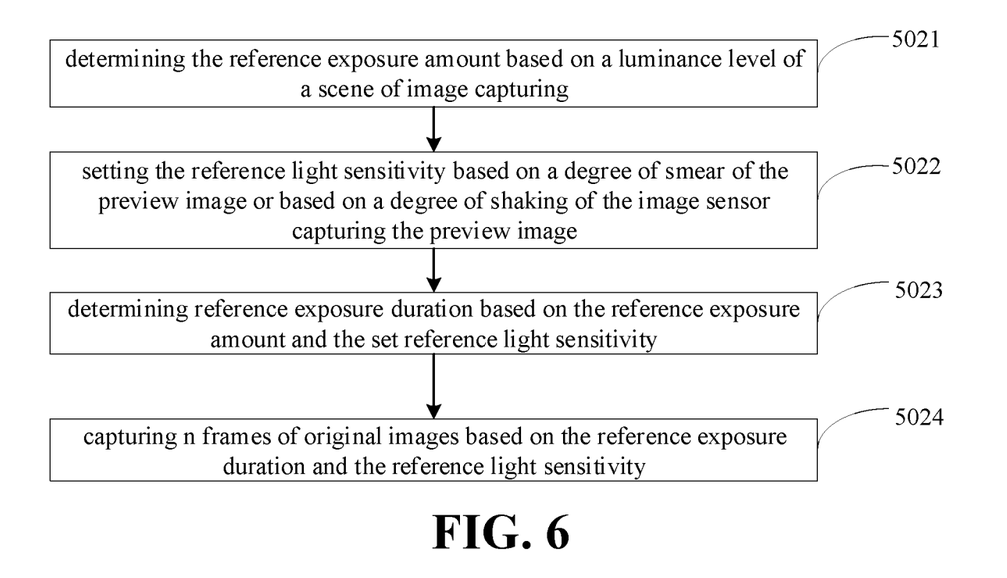
FIG. 6 is a flow chart of a sixth method of image processing based on a plurality of frames of images according to an embodiment of the present disclosure.

In a potential scenario, the reference exposure amount may be determined and the light sensitivity may be set based on a luminance level of a scene for image capturing, and reference exposure duration of each frame of the original image to be captured may be determined based on the reference exposure amount and the reference light sensitivity to obtain various HDR images. In such a way, the synthesized image may have a higher dynamic range, improving a general luminance level and quality of the image. The above-mentioned process may be illustrated in detail by referring to FIG. 6. FIG. 6 provides a flow chart of a sixth method of image denoising based on multi-frame images. As shown in FIG. 6, the operation of 502 may further include following operations.

In an operation of 5021, the reference exposure amount may be determined based on the luminance level of the scene for image capturing.

The exposure amount may refer to an amount of light received by the photosensitive element of the electronic device within exposure duration. The exposure amount may be related to the aperture, the exposure duration, and the light sensitivity. The aperture may be an opening through which light passes and determine an amount of light passing through within a unit of time. The exposure duration may refer to time consumed by the light passing through lens. The light sensitivity, represented by an ISO value, may be an index to evaluate a sensitivity of a negative film to the light and may indicate a speed of the photosensitive element to sense the light. A high ISO value may indicate the photosensitive element has a high light sensitivity.

Specifically, a preview image of a present scene may be captured by the image sensor. The photosensitive element may detect and obtain an ambient luminance level of each area of the preview image, and the reference exposure amount may be determined based on the luminance level of each area of the preview image. In response to the aperture being fixed, the reference exposure amount may specifically include the reference exposure duration and the reference light sensitivity.

In the present embodiment, the reference exposure amount may refer to an exposure amount appropriate with luminance information of the present scene, and the luminance information of the present scene may be obtained by performing light measuring on the preview image. A value of the reference exposure amount may be equal to a value of the reference light sensitivity multiplied by a value of the reference exposure duration.

In an operation of 5022, the reference light sensitivity may be set based on the degree of smear of the preview image or based on the degree of shaking of the image sensor capturing the preview image.

In the present embodiment, the reference light sensitivity may not be limited by the present disclosure. The reference light sensitivity may be a light sensitivity set to adapt to the degree of shaking at present based on the degree of smear of the preview image. Alternatively, the reference light sensitivity may be a light sensitivity set to adapt to the degree of shaking based on the degree of shaking of the image sensor capturing the preview image. A value of the reference light sensitivity may be within a range of 100 ISO to 200 ISO.

To be noted that, in the present embodiment, a plurality of frames of images with a relatively low light sensitivity may be captured at the same time. The plurality of frames of images may be synthesized to generate a target image. In such a way, a dynamic range and a general luminance level of an image captured at a night scene may be improved, and noise in the image may be effectively suppressed by controlling the value of the light sensitivity, such that the quality of the image captured in the night scene may be improved.

It may be understood that, the light sensitivity of image capturing may impact duration of image capturing. Overlong duration of image capturing may result in an increase of the degree of shaking of the image sensor during image capturing in a hand-held mode, such that the quality of the image may be impacted. Therefore, the reference light sensitivity corresponding to the preview image may be determined based on the degree of smear of the preview image or based on the degree of shaking the image sensor capturing the preview image, such that the duration of image capturing may be controlled within an appropriate range.

According to the present embodiment, displacing information may be acquired by the displacement sensor arranged in the electronic device to determine the degree of shaking, such that the degree of smear of the preview image or the degree of shaking of the image sensor capturing the preview image may be determined based on the displacing information acquired by the electronic device.

As an example, a present degree of shaking of the electronic device may be determined by acquiring present gyro-sensor information of the electronic device, and that is, the degree of shaking of the image sensor capturing the preview image may be acquired.

The gyro-sensor may be referred as an angular velocity sensor and may measure a rotational angular velocity of an object while the object is deflecting or tilting. In the electronic device, the gyro-sensor may detect a rotational and deflecting action, such that an actual movement of a user may be analyzed and determined accurately. Gyro information of the electronic device may include movement information of the electronic device along three dimensional directions in a three dimensional space. Three dimensions of the three dimensional space may be represented by a direction along an X-axis, a direction along a Y-axis, and a direction along a Z-axis. The X-axis, the Y-axis, and the Z-axis may be perpendicular to each other.

To be noted that, the degree of shaking of the image sensor capturing the preview image may be determined based on present gyro information of the electronic device. The greater the absolute value of a movement of the electronic device along the three dimensional directions, the higher the degree of shaking of the image sensor capturing the preview image. Specifically, a threshold absolute value of a gyro movement along each of the three dimensional directions may be predefined. A sum of the acquired absolute values of the gyro movement along the three dimensional directions may be calculated. The present degree of shaking of the image sensor capturing the preview image may be determined based on a relation between the sum of the acquired absolution values and the threshold absolute value.

For example, predefined threshold absolute values may include a first threshold absolute value A, a second threshold absolute value B, and a third threshold absolute value C, $A<B<C$, and the sum of the acquired absolute values of the gyro movement along the three dimensional directions may be S. In response to $S<A$, the degree of shaking of the image sensor capturing the preview image may be determined to be "no shaking". In response to $A<S<B$, the degree of shaking of the image sensor capturing the preview image may be determined to be "a slight degree of shaking". In response to $B<S<C$, the degree of shaking of the image sensor capturing the preview image may be determined to be "a low degree of shaking". In response to $S>C$, the degree of shaking of the image sensor capturing the preview image may be determined to be "a high degree of shaking".

To be noted that, the above examples are illustrative only and shall not limit the present disclosure. For an actual application, the number of threshold absolute values and a specific value of each threshold absolute value may be set according to an actual need. Based on the relation between the gyro information and each threshold absolute value, a mapping relation between the gyro information and the degree of shaking of the image sensor capturing the preview image may be preset.

Specifically, in response to the image sensor capturing the preview image having a relatively low degree of shaking, the reference light sensitivity corresponding to each frame of an image to be captured may be reduced to be a relatively small value, such that the noise of each frame of the image may be effectively suppressed, and the quality of the image may be improved. In response to the image sensor capturing the preview image having a relatively high degree of shaking, the reference light sensitivity corresponding to each frame of an image to be captured may be increased to be a relatively large value, such that duration of image capturing may be reduced.

For example, in response to the degree of shaking of the image sensor capturing the preview image being determined to be "no shaking", the reference light sensitivity may be determined to be a relatively small value to obtain an image with as high quality as possible. For example, the reference light sensitivity may be determined to be 100. In response to the degree of shaking of the image sensor capturing the preview image being determined to be "a slight degree of shaking", the reference light sensitivity may be determined to be a relatively large value to reduce duration of image capturing. For example, the reference light sensitivity may be determined to be 120. In response to the degree of shaking of the image sensor capturing the preview image being determined to be "a low degree of shaking", the reference light sensitivity may further be increased to reduce duration of image capturing. For example, the reference light sensitivity may be determined to be 180. In response to the degree of shaking of the image sensor capturing the preview image being determined to be "a high degree of shaking", the present degree of shaking may be determined to be overly high, and the reference light sensitivity may further be increased to reduce duration of image capturing. For example, the reference light sensitivity may be determined to be 200.

To be noted that, the above examples may be illustrative only and shall not limit the present disclosure. For an actual application, in response to the degree of shaking of the image sensor capturing the preview image being changed, the reference light sensitivity may be changed to obtain an optimal program. The mapping relation between the degree of shaking of the image sensor capturing the preview image and the reference light sensitivity corresponding to each frame of the image to be captured may be preset according to an actual demand.

According to the present embodiment, the degree of smear of the preview image may be positively related to the degree of shaking of the image sensor capturing the preview image. A process of setting the reference light sensitivity based on the degree of smear of the preview may be achieved by following the above-mentioned operations, and will not be repeatedly described hereinafter.

In an operation of 5023, the reference exposure duration may be determined based on the reference exposure amount and the set reference light sensitivity.

In the present embodiment, the reference exposure amount may include the reference exposure duration and the reference light sensitivity. Therefore, after determining the reference exposure amount based on the luminance level of the scene for image capturing and determining the reference light sensitivity based on the degree of smear of the preview image or based on the degree of shaking of the image sensor capturing the preview image, the reference exposure duration may be determined based on the reference exposure amount and the reference light sensitivity.

In an operation of 5024, n frames of original images may be captured based on the reference exposure duration and the reference light sensitivity.

In the present embodiment, after determining the reference exposure duration and the reference light sensitivity of each frame of an original image to be captured, the image sensor may be controlled to capture the original image based on the exposure duration and the reference light sensitivity of each frame of the original image to be captured, which will not be described in details hereinafter.

In an operation of 503, at least one frame of an original image with an exposure amount lower than the reference exposure amount may be captured.

In the present embodiment, during capturing the at least one frame of an original image with the exposure amount lower than the reference exposure amount, the reference exposure duration may be compensated based on a preset exposure compensation level to obtain compensated exposure duration less than the reference exposure duration, such that the at least one frame of the original image may be captured based on the compensated exposure duration and the reference light sensitivity.

It may be understood as different exposure compensation strategies being performed on the at least one frame of the original image respectively according to the exposure compensation level, such that the at least one frame of original image to be captured may correspond to different exposure amounts, and images with different dynamic ranges may be obtained.

It may be noted that, according to an initial definition of the exposure amount, the exposure amount may not be referred as an exact value, but may be referred as "all combinations of the aperture and the exposure duration able to provide a same exposure amount". The light sensitivity, the aperture, and the exposure duration may determine the exposure amount of the camera, and various combinations of parameters may generate the same exposure amount. The exposure compensation level may be a parameter to adjust the exposure amount, such that some images may be under-exposed, some images may be over-exposed, and some images may be properly exposed. In the present embodiment, the exposure compensation level corresponding to the at least one frame of the original image may be within a range of EV-5 to EV-1.

As an example, capturing the at least one frame of the original image may specifically include capturing two frames of original images. At this time, the two frames of original images may correspond to difference exposure compensation levels, and the exposure compensation levels of the two frames of original images may be less than EV0. Specifically, the reference exposure duration may be compensated based on the exposure compensation levels corresponding to the two frames of original images to obtain the compensated exposure duration less than the reference exposure duration, such that the two frames of original images may be captured based on the compensated exposure duration and the reference light sensitivity.

According to the present embodiment, the number n of frames of original images with the reference exposure amount may be determined based on the quality of the preview image. n frames of original images meeting the reference exposure amount may be captured, and at least one frame of the original image may be captured at the same time with the exposure amount less than the reference exposure amount. In such a way, the captured plurality of frames of original images may be determined by capturing n frames of original images with the reference exposure amount and capturing at least one frame of the original image with the exposure amount less than the reference exposure amount, such that the quality of imaging may be improved, obtaining an image with a high definition.

Figure 7:
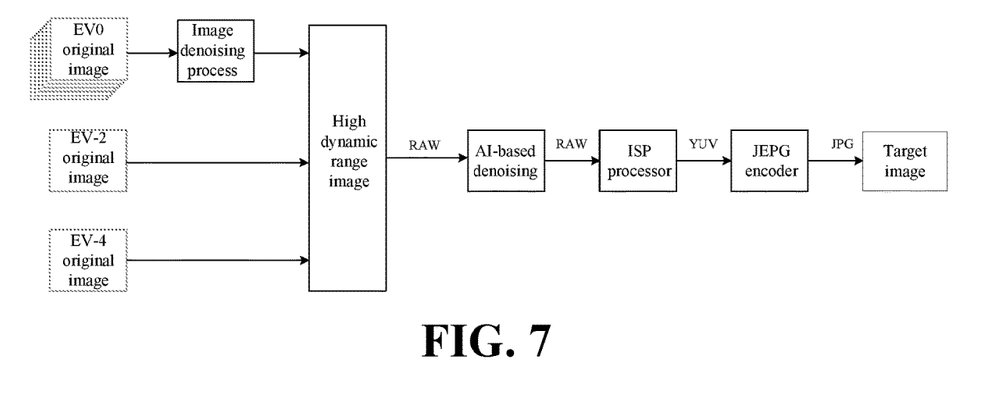
FIG. 7 is an example illustrative view of a method of image processing based on a plurality of frames of images according to an embodiment of the present disclosure.

As an example, as shown in FIG. 7, an example illustrative view of a method of image processing based on a plurality of frames of images according to an embodiment of the present disclosure is provided. It may be known from FIG. 7, after detecting the preview image, the scene for image capturing may be determined to be a night scene, the image sensor may be controlled to capture at least two frames of original images with light sensitivity of EV0, one frame of the original image with a light sensitivity of EV-2, and one frame of the original image with a light sensitivity of EV-4. The original image may be the RAW image without any processing. Denoising may be performed on the at least two frames of original images with the light sensitivity of EV0 to obtain the synthesized denoised image, improving the SNR of the image. High dynamic synthesis may be performed on the synthesized denoised image, the frame of the original image with the light sensitivity of EV-2, and the frame of the original image with the light sensitivity of EV-4 to obtain the HDR image. The HDR image may also be an image in the RAW format. Further, AI-based denoising may be performed on the HDR image to obtain the target denoised image. The target denoised image may be inputted into the ISP pipeline, format conversion may be performed, and the target denoised image may be converted from the RAW format into the YUV format. Eventually, the target denoised image in the YUV format may be inputted into a JPEG encoder to obtain an image in a JPG format.

The present disclosure may further provide an image processing apparatus based on a plurality of frames of images to achieve the above-mentioned embodiments.

Figure 8:
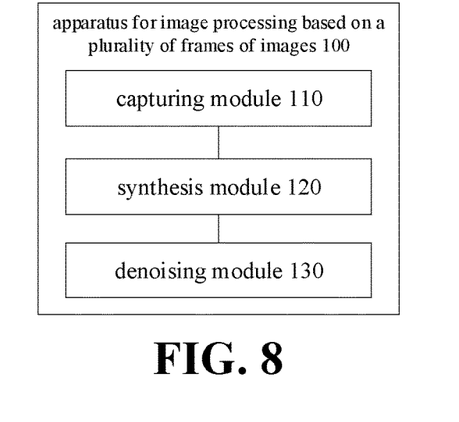
FIG. 8 is a structural diagram of an apparatus of image processing based on a plurality of frames of images according to an embodiment of the present disclosure.

FIG. 8 is a structural diagram of an apparatus of image processing based on a plurality of frames of images according to an embodiment of the present disclosure.

As shown in FIG. 8, the image processing apparatus 100 based on a plurality of frames of images may include a capturing module 110, a synthesis module 120, and a denoising module 130.

The capturing module 110 may be arranged to capture the plurality of frames of original images.

The synthesis module 120 may be arranged to obtain the HDR image perform image synthesis on the plurality of frames of original images.

The denoising module 130 may be arranged to perform AI-based denoising on the HDR image to obtain the target denoised image.

As a potential situation, the denoising module 130 may further be arranged to perform following operations.

The noise characteristics of the HDR image may be identified by the neural network model. The neural network model may learn and obtain the mapping relation between the light sensitivity of the HDR image and the noise characteristics. Denoising may be performed on the HDR image based on the identified noise characteristics to obtain the target denoised image.

As another potential situation, the neural network model may be trained by taking a plurality of sample images having various light sensitivities as samples. Training of the neural network model may be completed when the noise characteristics identified by the neural network model matches with the noise characteristics labeled in a corresponding sample image.

As another potential situation, the plurality of frames of original images may include at least two frames of first images having a same exposure amount and at least one frame of a second image having an exposure amount less than the exposure amount of the first images. The synthesis module 120 may include following units.

A denoising unit may be arranged to perform denoising on the at least one frames of the second image to obtain the synthesized denoised image.

A first synthesis unit may be arranged to perform high dynamic synthesis on the synthesized denoised image and the at least one frame of the second image to obtain the HDR image.

As another potential situation, the synthesis module 120 may further include following units.

An input unit may be arranged to input the plurality of frames of original images into the high dynamic synthesis model to obtain the synthesis weight of each area in a corresponding original image.

A second synthesis unit may be arranged to perform image synthesis on the plurality of frames of original images area by area based on the synthesis weight of each area to obtain the HDR image.

As another potential situation, the high dynamic synthesis model may learn and obtain the mapping relation between characteristics of each area of the original images and the synthesis weight. The characteristics may indicate the exposure amount and the luminance level of a corresponding area.

As another potential situation, the image processing apparatus 100 based on the plurality of frames of images may further include following modules.

A preview module may be arranged to capture the preview image. The preview module may include following units.

A determination unit may be arranged to determine the number n of frames of images with the reference exposure amount based on the quality of the preview image. The n may be a natural number greater than or equal to 2.

A first capturing unit may be arranged to capture n frames of original images meeting the reference exposure amount.

A second capturing unit may be arranged to capture at least one frame of the original image with an exposure amount less than the reference exposure amount.

As another potential situation, the first capturing unit may specifically be arranged to perform following operations.

The reference exposure amount may be determined based on the luminance level of the scene for image capturing. The reference exposure duration may be determined based on the reference exposure amount and the preset reference light sensitivity. n frames of original image may be captured based on the reference exposure duration and the reference light sensitivity.

As another potential situation, the second capturing unit may specifically be arranged to perform following operations.

Compensation may be performed on the reference exposure duration based on the preset exposure compensation level to obtain the compensated exposure duration less than the reference exposure duration. At least one frame of the original image may be captured based on the compensated exposure duration and the reference light sensitivity.

As another potential situation, the at least one frame of the original image may specifically be two frames of original images. The two frames of original images may correspond to different exposure compensation levels, and the exposure compensation levels of the two frames of original images may be less than EV0.

As another potential situation, the first capturing unit may specifically be arranged to perform following operation.

The reference light sensitivity may be set based on the degree of smear of the preview image or based on the degree of shaking of the image sensor capturing the preview image.

As another potential situation, the value of the reference light sensitivity may be within the range of 100 ISO to 200 ISO.

As another potential situation, the exposure compensation level corresponding to the at least one frame of the original image may be within the range of EV-5 to EV-1.

As another potential situation, the number n of frames of images may be equal to 3 or 4.

As another potential situation, the image processing apparatus 100 based on the plurality of frames of images may further include following modules.

A conversion module may be arranged to convert a format of the target denoised image into the YUV format.

To be noted that, the above-mentioned description about the method of image denoising based on a plurality of frames of images may be adapted to an image denoising apparatus based on a plurality of frames of images of a same embodiment, and will not be repeatedly illustrated hereinafter.

According to the image processing apparatus based on a plurality of frames of images provided in the present embodiment, a plurality of frames of original images may be captured, a HDR image may be obtained by performing image synthesis on the plurality of frames of original images, and AI-based denoising may be performed on the HDR image to obtain a target denoised image. In such a way, image noise and effective details of the HDR image may be accurately identified by performing denoising, and the number of frames of original images to be captured may be reduced to some extent compared to a process without denoising. A light sensitivity for capturing each frame of an original image may be increased to reduce duration of capturing each frame of the original image, such that total duration of image capturing may be reduced, a smear image caused by prolonged duration of image capturing may be avoided, enabling a fine image of a night scene to be captured. In addition, after performing high dynamic synthesis on the plurality of frames of original images, denoising may be performed, such that a high luminance area and a low luminance area of the HDR image obtained by performing high dynamic synthesis may be denoised effectively at the same time, improving effectivity of denoising, such that the target denoised image may have a reduced noise and maintain image details at the same time, exhibiting a better imaging effect.

Figure 9:
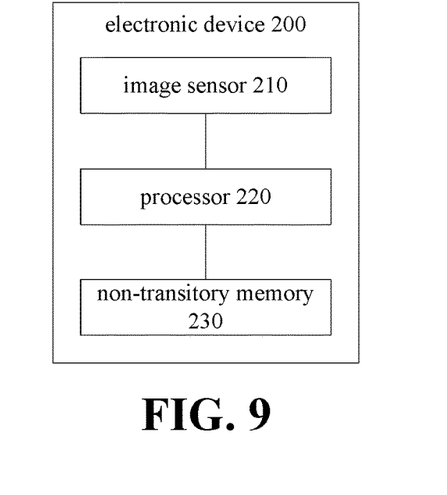
FIG. 9 is a structural diagram of an electronic device according to an embodiment of the present disclosure.

To achieve the above-mentioned embodiment, the present disclosure may further provide an electronic device 200 as shown in FIG. 9. The electronic device 200 may include an image sensor 210, a processor 220, a non-transitory memory 230, and a computer program stored in the non-transitory memory 230 and able to be executed by the processor 220. The image sensor 210 may be electrically connected to the processor 220. When the processor is executing the computer program, the method of image processing based on a plurality of frames of images as described in the above-mentioned embodiments may be achieved.

As a potential situation, the processor 220 may include an image signal processing (ISP) pipeline.

The ISP pipeline may be arranged to control the image sensor to capture the plurality of frames of original images and obtain the HDR image by performing image synthesis on the plurality of frames of original images.

As another potential situation, the processor 220 may further include a graphics processing unit (GPU) connected to the ISP pipeline.

The GPU may be arranged to perform AI-based denoising on the HDR image to obtain the target denoised image. The GPU may further be arranged to perform coding on the target denoised image.

Figure 10:
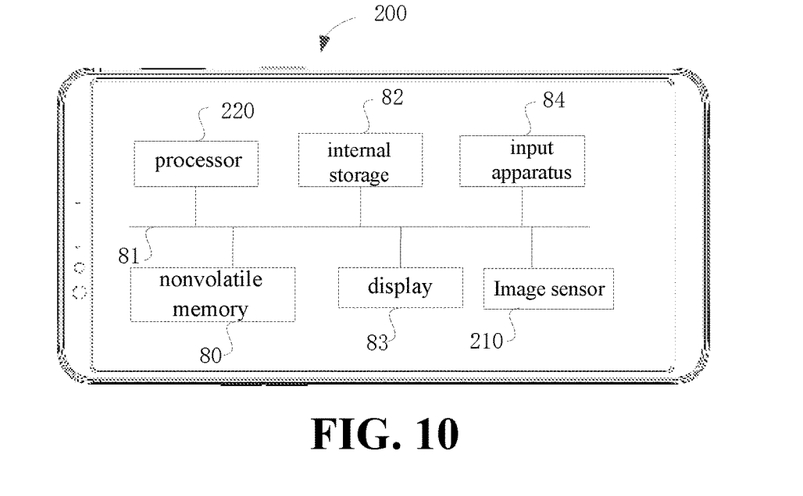
FIG. 10 is a principle diagram of an electronic device according to an embodiment of the present disclosure.

As an example, as shown in FIG. 10, on the basis of the electronic device shown in FIG. 9, a principle diagram of an electronic device according to an embodiment of the present disclosure is shown in FIG. 10. The non-transitory memory 230 of the electronic device 200 may include a nonvolatile memory 80, an internal storage 82, and the processor 220. The non-transitory memory 230 may have a computer-readable instruction stored in. The computer-readable instruction may be executed by the non-transitory memory to allow the processor 220 to perform the method of image processing based on a plurality of frames of images according to any one of the above-mentioned embodiments.

As shown in FIG. 10, the electronic device 200 may include the processor 220, the nonvolatile memory 80, the internal storage 82, a display screen 83, and an input apparatus 84, and the processor 220, the nonvolatile memory 80, the internal storage 82, a display screen 83, and an input apparatus may be connected via a bus line 81. The nonvolatile memory 80 of the electronic device 200 may have an operating system and a computer-readable instruction stored in. The computer-readable instruction may be executed by the processor 220 to achieve the method of exposure controlling provided in the implementations of the present disclosure. The processor 220 may be arranged to provide a computing and controlling capability to support the entire electronic device 200 to run. The internal storage 82 of the electronic device may be an environment for the computer-readable instruction stored in the nonvolatile memory 80 to run. The display screen 83 of the electronic device 200 may be a liquid crystal display or an electronic ink display. The input apparatus 84 may be a touch layer covered on the display screen 83, or may be a button, a trackball, or a touch pad arranged on an outer shell of the electronic device 200, or may be a plugged keyboard, touch pad, a mouse, or the like. The electronic device 200 may be a mobile phone, a tablet computer, a laptop computer, a personal digital assistant, or a wearable device (such as an intelligent bracelet, an intelligent watch, an intelligent helmet, intelligent glasses). Any one of skill in the art shall understand that the structure shown in FIG. 10 may be a part of structures relative to the present disclosure, and does not limit the electronic device 200 onto which the present embodiment may be adapted. A specific electronic device 200 may include more or fewer components as shown in the figure, or may include a combination of some components, or may have a different arrangement of the components.

Figure 11:
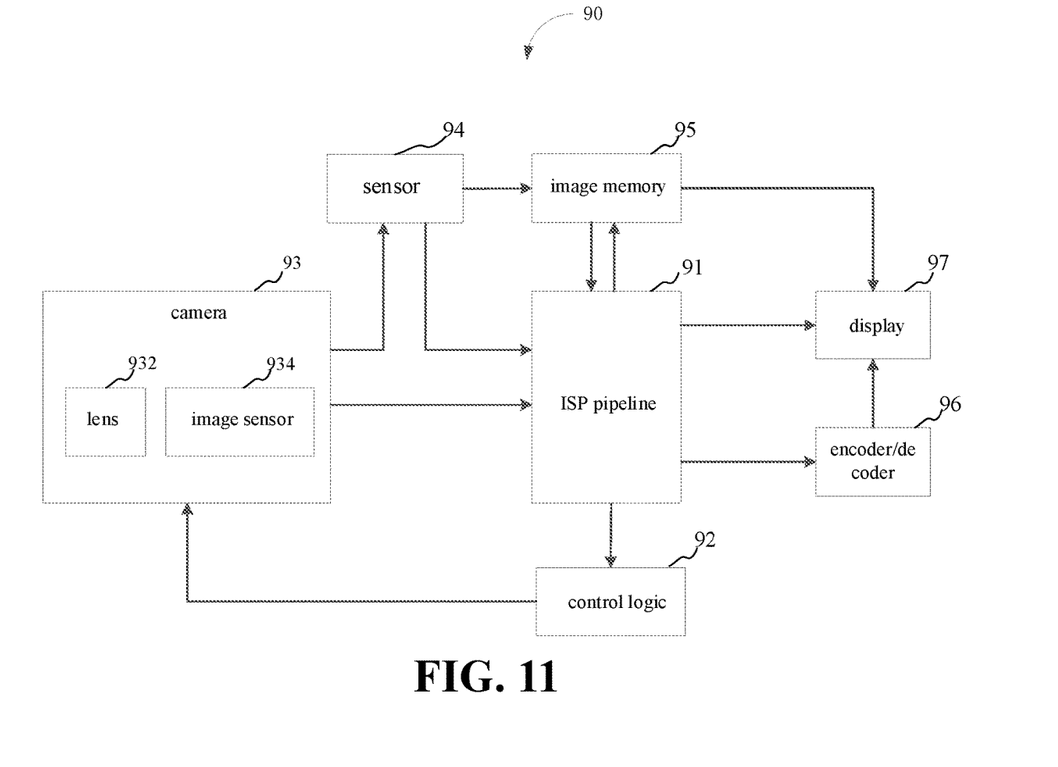
FIG. 11 is a principle diagram of an image processing circuit according to an embodiment of the present disclosure.

To achieve the above-mentioned embodiments, the present disclosure may further provide an image processing circuit as shown in FIG. 11. FIG. 11 is a principle diagram of an image processing circuit according to an embodiment of the present disclosure. As shown in FIG. 11, the image processing circuit 90 may include an ISP pipeline 91 (the ISP pipeline 91 may serve as the processor 220) and a GPU.

The ISP pipeline may be arranged to electrically connect to the GPU and control the GPU to capture a plurality of frames of original images and obtain the HDR image by performing image synthesis on the plurality of frames of original images.

The GPU may be arranged to electrically connect to the ISP pipeline, and may be arranged to perform AI-based denoising on the HDR image to obtain the target denoised image.

Image data captured by a camera 93 may be processed by the ISP pipeline 91 first. The ISP pipeline 91 may analyze the image data to capture image statistical information of one or more control parameters for determining a performance of the camera 93. A camera module 310 may include one or more lenses 932 and an image sensor 934. The image sensor 934 may include a color filter array (such as a Bayer filter). The image sensor 034 may acquire light intensity and wavelength information captured by each image pixel and may provide a set of original image data able to be processed by the ISP pipeline 91. The sensor 94 (such as a gyro) may be arranged to provide an acquired image processing parameter to the ISP pipeline 91 based on a type of an interface of the sensor 94. The interface of the sensor 94 may be a standard mobile imaging architecture (SMIA) interface, other serial or parallel camera interfaces, or a combination of the above-mentioned interfaces.

In addition, the image sensor 934 may send the original image data to the sensor 94. The sensor 94 may provide the original image data to the ISP pipeline 91 based on the type of the interface of the sensor 94, or save the original image data into a non-transitory image memory 95.

The ISP pipeline 91 may process the original image data according to various formats from one pixel to another pixel. For example, each image pixel may have bit depths of 8, 10, 12, or 14. The ISP pipeline 91 may perform one or more image processing operations on the original image data and collect statistical information about the image data. The one or more image processing operations may be performed according to a same bit depth or different bit depths.

The ISP pipeline 91 may receive the image data from the non-transitory image memory 95. For example, the interface of the sensor 94 may send the original image data to the non-transitory image memory 95, and the original image data in the non-transitory image memory 95 may be provided to the ISP pipeline 91 for processing. The non-transitory image memory 95 may be the non-transitory memory 330, a part of the non-transitory memory 330, a storage device, an independent and specific non-transitory memory arranged within the electronic device, and may include characteristics of direct memory access (DMA).

When the ISP pipeline 91 receives the original image data sent from the interface of the image sensor 934, the interface of the sensor 94, or the non-transitory image memory 95, one or more image processing operations may be performed, such as temporal filtering. Processed image data may be sent to the non-transitory image memory 95, such that other processing may be performed on the image data before the image data being displayed. The ISP pipeline 91 may receive processed data from the non-transitory image memory 95 and may process image data in an original domain and in a RGB and YCbCr space. The image data processed by the ISP pipeline 91 may be output to a display 97 (the display 97 may include the display screen 83) to be shown to a user and/or to further be processed by an image engine or the GPU. In addition, the output of the ISP pipeline 91 may be sent to the non-transitory image memory 95, and the display 97 may read and obtain the image data from the non-transitory image memory 95. In an embodiment, the non-transitory image memory 95 may be configured to achieve one or more frame buffers. In addition, the output of the ISP pipeline 91 may be sent to an encoder/decoder 96, such that the image data may be encoded or decoded. The encoded image data may be stored and decompressed before being displayed on the display 97. The encoder/decoder 96 may be achieved by a central processing unit (CPU), or a GPU, or a coprocessor.

Statistical data determined by the ISP pipeline 91 may be sent to a control logic 92. For example, the statistical data may include statistical information of the image sensor 934, such as an automatic exposure, automatic white balancing, automatic focusing, flash detection, black-level compensation, lens 932 shading correction, and the like. The control logic 92 may include a processing unit and/or a micro controller executing one or more routines (such as firmware), and the one or more routines may determine a control parameter of the camera 93 and a control parameter of the ISP pipeline 91 based on the received statistical data. For example, the control parameter of the camera 93 may include a control parameter of the sensor 94 (such as gain, integration time of the exposure control, an anti-shaking parameter, and the like), a control parameter of a camera flash, a control parameter of the lens 932 (such as a focal length of a focus or a zoom), or a combination of the above-mentioned parameters. The control parameter of the ISP may include a gain level for automatic white balancing and color adjustment (such as during RGB processing) and color correction matrix, and a shading correction parameter of the lens 932.

Following operations may be included during performing the image processing technique shown in FIG. 11 to achieve the method of image denoising based on a plurality of frames of images. The ISP pipeline may control the image sensor to capture a plurality of frames of original images. The HDR image may be obtained by performing image synthesis on the plurality of frames of original images. The GPU may perform AI-based denoising on the HDR image to obtain the target denoised image.

To achieve the above mentioned embodiment, the present embodiment may further provide a non-transitory storage medium. An instruction stored in the non-transitory storage medium may be executed by a processor, and the processor may perform operations of: capturing a plurality of frames of original images, obtaining the HDR image by performing image synthesis on the plurality of frames of original images; and performing AI-based denoising on the HDR image to obtain the target denoised image.

Any one of skill in the art shall understand that all of or a part of processes in the above-mentioned embodiments may be achieved by a computer program instructing relative hardware. The computer program may be stored in a non-volatile computer-readable storage medium. When the computer program is executed, the processes as described in any one of the above-mentioned embodiments may be included. The non-transitory storage medium may be a magnetic disk, an optical disk, a read-only memory (ROM), and the like.

The above-mentioned embodiments illustrate only some potential implementations of the present disclosure, the illustration is quite specific and in details, but shall not be interpreted as a limitation of the present disclosure. It may be noted that, to any one of skill in the art, without departing from the concept of the present disclosure, some transformation and modification may be performed and should be within the scope of the present disclosure. Therefore, the scope of the present disclosure shall be subject to the claims of the present disclosure.

What is claimed is:

1. A method of image processing based on a plurality of frames of images, comprising:
    capturing a preview image of a scene;
    capturing number (n) frames of original images of the scene, wherein a value of n for the n frames of original images is determined based on quality of the preview image;
    obtaining a high dynamic range (HDR) image by performing image synthesis on the n frames of original images; and
    performing artificial intelligent (AI)-based denoising on the HDR image to obtain a target denoised image,
    wherein capturing the n frames of original images comprises:
        determining the n frames of original images having a reference exposure amount to be captured based on the quality of the preview image, wherein the n is a natural number greater than or equal to 2;
        capturing the n frames of original images meeting the reference exposure amount; and
        capturing at least one frame of an original image having an exposure amount lower than the reference exposure amount.

2. The method according to claim 1, wherein performing the AI-based denoising on the HDR image to obtain the target denoised image comprises:
    performing, by a neural network model, noise characteristics identification on the HDR image, wherein the neural network model learns and obtains a mapping relation between a light sensitivity and the noise characteristics of the HDR image; and
    performing denoising on the HDR image based on the identified noise characteristics to obtain the target denoised image.

3. The method according to claim 2, wherein the neural network model is trained by taking a plurality of sample images with a plurality of light sensitivities as samples, and the training of the neural network model is completed when the noise characteristics identified by the neural network model matches with the noise characteristics labeled in a corresponding sample image.

4. The method according to claim 1, wherein
    the n frames of original images comprise at least two frames of first images having a same exposure amount and at least one frame of a second image having an exposure amount lower than the exposure amount of the first images; and
    obtaining the HDR image by performing image synthesis on the n frames of images comprises:
        performing multi-frame denoising on the at least two frames of the first images to obtain a synthesized denoised image; and
        performing high dynamic synthesis on the synthesized denoised image and the at least one frame of the second image to obtain the HDR image.

5. The method according to claim 1, wherein obtaining the HDR image by performing the image synthesis on the n frames of original images comprises:
    inputting the n frames of original images into a high dynamic synthesis model to obtain a synthesis weight of each area of a corresponding original image; and
    performing image synthesis on each area of the n frames of original images based on the synthesis weight of each area to obtain the HDR image.

6. The method according to claim 5, wherein the high dynamic synthesis model learns and obtains a mapping relation between characteristics of each area of the n frames of original images and the synthesis weight; and the characteristics of each area is arranged to indicate an exposure amount of each area and a luminance level of a corresponding area.

7. The method according to claim 1, wherein capturing the n frames of original images meeting the reference exposure amount comprises:
    determining the reference exposure amount based on a luminance level of a scene of image capturing;
    determining reference exposure duration based on the reference exposure amount and a preset reference light sensitivity; and capturing the n frames of original images based on the reference exposure duration and the reference light sensitivity.

8. The method according to claim 7, wherein capturing the at least one frame of the original image having the exposure amount lower than the reference exposure amount comprises:
performing compensation on the reference exposure duration based on a preset exposure compensation level to obtain compensated exposure duration shorter than the reference exposure duration; and
capturing the at least one frame of the original image based on the compensated exposure duration and the reference light sensitivity.

9. The method according to claim 7, wherein the method further comprises:
before determining the reference exposure duration based on the reference exposure amount and the preset reference light sensitivity, setting the reference light sensitivity based on a degree of smear of the preview image or a degree of shaking of an image sensor capturing the preview image.

10. The method according to claim 7, wherein a value of the reference light sensitivity is within a range of 100ISO to 200ISO.

11. The method according to claim 1, wherein
the at least one frame of the original image comprises two frames of original images; and
the two frames of original images correspond to different exposure compensation levels, and the exposure compensation levels corresponding to the two frames of original images are less than EV0.

12. The method according to claim 1, wherein an exposure compensation level corresponding to the at least one frame of the original image is within a range of EV-5 to EV-1.

13. The method according to claim 1, wherein the n is equal to 3 or 4.

14. The method according to claim 1, wherein the method further comprises:
after performing the AI-based denoising on the HDR image to obtain the target denoised image, converting a format of the target denoised image into a YUV format.

15. An electronic device, comprising: an image sensor, a non-transitory memory, a processor, and a computer program stored in the non-transitory memory and run by the processor, wherein
the processor comprises an image signal processing (ISP) pipeline and a graphics processing unit (GPU) connected to the ISP pipeline;
the ISP pipeline is arranged to control the image sensor to capture a preview image of a scene, capture number (n) frames of original images of the scene, and perform high dynamic synthesis on the n frames of original images to obtain a HDR image, wherein a value of n for the n frames of original images is determined based on quality of the preview image;
the GPU is arranged to perform AI-based denoising on the HDR image to obtain a target denoised image; and
capturing the n frames of original images comprises:
determining the n frames of original images having a reference exposure amount to be captured based on the quality of the preview image, wherein the n is a natural number greater than or equal to 2;
capturing the n frames of original images meeting the reference exposure amount; and
capturing at least one frame of an original image having an exposure amount lower than the reference exposure amount.

16. The electronic device according to claim 15, wherein the GPU is further arranged to perform noise characteristics identification on the HDR image and perform denoising on the HDR image based on the identified noise characteristics to obtain the target denoised image.

17. The electronic device according to claim 15, wherein
the n frames of original images comprise at least two frames of first images having a same exposure amount and at least one frame of a second image having an exposure amount lower than the exposure amount of the at least two frame of first images; and
the ISP pipeline is further arranged to perform multi-frame denoising on the at least two frames of first images to obtain a synthesized denoised image and perform high dynamic synthesis on the synthesized denoised image and the at least one frame of the second image to obtain the HDR image.

18. The electronic device according to claim 15, wherein the ISP pipeline is further arranged to input the n frames of original images into a high dynamic synthesis model to obtain a synthesis weight of each area of a corresponding original image and perform image synthesis on each area of the n frames of original images based on the synthesis weight of each area to obtain the HDR image.

19. A computer-readable non-transitory storage medium, comprising a computer program stored in, wherein the computer program is capable of being executed by a processor to perform operations of:
capturing a preview image of a scene;
capturing number (n) frames of original images of the scene, wherein a value of n for the n frames of original images is determined based on quality of the preview image;
obtaining a high dynamic range (HDR) image by performing image synthesis on the n frames of original images; and
performing artificial intelligent (AI)-based denoising on the HDR image to obtain a target denoised image,
wherein capturing the n frames of original images comprises:
determining the n frames of original images having a reference exposure amount to be captured based on the quality of the preview image, wherein the n is a natural number greater than or equal to 2;
capturing the n frames of original images meeting the reference exposure amount; and
capturing at least one frame of an original image having an exposure amount lower than the reference exposure amount.

* * * * *